(12) United States Patent
Mori et al.

(10) Patent No.: US 7,759,602 B2
(45) Date of Patent: Jul. 20, 2010

(54) LASER PROCESSING HEAD

(75) Inventors: Atsushi Mori, Yamanashi (JP); Ryoma Okazaki, Yamanashi (JP)

(73) Assignee: Fanuc Ltd. (JP)

( * ) Notice: Subject to any disclaimer, the term of this patent is extended or adjusted under 35 U.S.C. 154(b) by 1040 days.

(21) Appl. No.: 11/457,780

(22) Filed: Jul. 14, 2006

(65) Prior Publication Data

US 2007/0012669 A1   Jan. 18, 2007

(30) Foreign Application Priority Data

Jul. 15, 2005   (JP)   .............................. 2005-207237

(51) Int. Cl.
  B23K 26/00   (2006.01)
  B23K 26/02   (2006.01)
  B23K 26/14   (2006.01)
(52) U.S. Cl. ........................... 219/121.63; 219/121.65; 219/121.67; 219/121.75; 219/121.84
(58) Field of Classification Search ................................
    219/121.63–121.72, 121.75, 121.84
  See application file for complete search history.

(56) References Cited

U.S. PATENT DOCUMENTS

| | | | | | |
|---|---|---|---|---|---|
| 4,689,467 | A | * | 8/1987 | Inoue ....................... | 219/121.6 |
| 4,942,284 | A | * | 7/1990 | Etcheparre et al. ...... | 219/121.67 |
| 5,008,510 | A | * | 4/1991 | Koseki ..................... | 219/121.7 |
| 5,061,839 | A | * | 10/1991 | Matsuno et al. ........ | 219/121.83 |
| 5,245,155 | A | * | 9/1993 | Pratt et al. ............. | 219/121.63 |
| 5,298,716 | A | * | 3/1994 | Ogawa et al. .......... | 219/121.67 |
| 5,780,806 | A | * | 7/1998 | Ferguson et al. ....... | 219/121.68 |
| 6,124,565 | A | * | 9/2000 | Morishita et al. ...... | 219/121.67 |
| 6,204,473 | B1 | * | 3/2001 | Legge ................... | 219/121.67 |
| 6,822,187 | B1 | * | 11/2004 | Hermann et al. ....... | 219/121.63 |
| 6,833,222 | B1 | * | 12/2004 | Buzerak et al. ........ | 430/5 |

FOREIGN PATENT DOCUMENTS

| | | | |
|---|---|---|---|
| DE | 19628857 A1 | | 1/1998 |
| JP | 4284993 A | * | 10/1992 |
| JP | 6106375 A | | 4/1994 |

OTHER PUBLICATIONS

European Search Report issued in corresponding foreign application on Dec. 4, 2006.

\* cited by examiner

*Primary Examiner*—Samuel M Heinrich
(74) *Attorney, Agent, or Firm*—Lowe Hauptman Ham & Berner, LLP

(57) ABSTRACT

A laser processing head comprises nozzle-holding means (5) for holding a nozzle in which a nozzle hole (11) is formed; condensing optical system-holding means (3) for holding a condensing optical system (2), the condensing optical system-holding means being slidably arranged in the nozzle-holding means while maintaining sealing, moving means (6) for slide-moving the nozzle-holding means and the condensing optical system-holding means relative to each other; gas-feeding means (13, 19) for feeding a gas into a laser processing head chamber (8) formed between the condensing optical system of the condensing optical system-holding means and the nozzle hole of the nozzle-holding means; passages (31) formed in the nozzle-holding means to communicate the laser processing head chamber with the exterior of the nozzle-holding means; slide members (33) that slide in the passages while maintaining sealing; and coupling means (35) for coupling the slide members to the condensing optical system-holding means. Therefore, the condensing optical system-holding means or the nozzle-holding means can be moved with a small force without providing an annular gas sub-chamber.

11 Claims, 8 Drawing Sheets

LASER PROCESSING HEAD

RELATED APPLICATIONS

The present application is based on, and claims priority from, Japanese Application Number 2005-207237, filed Jul. 15, 2005, the disclosure of which is hereby incorporated by reference herein in its entirety.

BACKGROUND OF THE INVENTION

1. Field of the Invention

The present invention relates to a laser processing head for processing a to-be-processed work with a laser beam by focusing the laser beam through a condensing optical system and projecting the beam through a processing nozzle while injecting an assist gas through the processing nozzle.

2. Description of the Related Art

In a laser processing head of a laser machine, a condensing optical system, for focusing a laser beam, is held and an assist gas feed port for feeding an assist gas into the laser processing bead is formed. The laser beam focused through the condensing optical system, such as a condensing lens, and the assist gas fed through the assist gas feed port, are directed to the to-be-machined work though the processing nozzle of the laser processing head so that the work is processed. In the laser processing head, further, the space between the condensing optical system and the processing nozzle is called a laser processing head chamber.

In recent years, further, a carbon dioxide laser has been used as a high-output laser. In the carbon dioxide laser, it becomes necessary to decrease the number of condensing optical systems such as the number of the transparent condensing lenses as much as possible from the standpoint of the wavelength. Therefore, the laser processing head holds a single condensing optics. Atmospheric pressure exists in the space on the side opposite to the laser processing head chamber relative to the condensing lens. The laser processing head and the condensing lens can be moved relative to each other by an adjusting mechanism to freely adjust a positional relationship between the processing nozzle and the condensing lens.

During processing with the laser beam, the assist gas is fed into the laser processing head from the assist gas feed port, and the interior of the laser processing head chamber achieves a predetermined high pressure of, for example, 1 MPa. The condensing lens is held by a condensing lens-holding portion, which is larger than the condensing lens and surrounds it. When the condensing lens-holding portion has an outer diameter of, for example, 60 mm, a force which is as great as about 2.8 kN is exerted on a pressure-receiving surface constituted by the condensing lens and by the condensing lens-holding portion. Against this force, the adjusting mechanism must move the processing nozzle and/or the condensing lens relatively. Therefore, a large drive unit is necessary for operating the adjusting mechanism so that the machining head itself becomes bulky or complex.

To solve this problem, Japanese Patent Publication No. 2804206 discloses a laser processing head equipped with an annular gas sub-chamber and a piston cylinder. FIG. 8 is a sectional view in the longitudinal direction of a conventional laser processing head as disclosed in the Japanese Patent Publication No. 2804206. The laser processing head 114 disclosed in FIG. 8 is mainly constituted by a nozzle portion 105 in which a nozzle hole 111 is formed, and a condensing lens-holding portion 103 for holding a condensing lens 102. A laser processing head chamber 108 is formed between the condensing lens 102 and the nozzle hole 111.

As shown, an upper annular protrusion 117 and a lower annular protrusion 109 are protruded from the inner peripheral surface of the nozzle portion 105. The outer peripheral surface of the condensing lens-holding portion 103 is engaged with the upper annular protrusion 117 and with the lower annular protrusion 109. Further, the condensing lens-holding portion 103 is coupled, by a coupling portion 107, to a piston 106a of an actuator 106. Due to the actuator 106 which is the adjusting mechanism, the condensing lens-holding portion 103 can slide in the nozzle portion 105.

An assist gas feed port 113 is formed in the nozzle portion 105 so as to be communicated with the laser processing head chamber 108. The assist gas is fed from the source of the assist gas disposed on the outer side of the laser processing head 114 into the laser processing head chamber 108 through a feed passage 119 and the assist gas feed port 113. The assist gas is fed at all times during the processing with the laser beam, and a predetermined high pressure is maintained in the machining head chamber 108.

As shown, a flange 116 arranged between the upper annular protrusion 117 and the lower annular protrusion 109 is provided on the condensing lens-holding portion 103. The end of the flange 116 is sized to engage with the inner peripheral surface of the nozzle portion 105. A gap between the condensing lens-holding portion 103 and the nozzle portion 105 is sealed with a sealing member. Therefore, an annular gas sub-chamber 115 is formed between the upper end surface of the flange 116 and the lower end surface of the upper annular protrusion 117.

An opening portion 153 is formed in the lower end surface of the upper annular protrusion 117. A branch passage 142 branched from a branching portion 141 in the feed passage 119 extends to the opening portion 153. Therefore, the assist gas in the feed passage 119 is fed into the annular gas sub-chamber 115 through the branch passage 142.

As shown, if the inner diameter of the lower annular protrusion 109 is denoted by D1, the inner diameter of the nozzle portion 105 by D2 and the inner diameter of the upper annular protrusion 117 by D3, the pressure-receiving area of the condensing lens-holding portion 103 is expressed by $DI^2/4 \times \pi$ and the pressure-receiving area of the annular gas sub-chamber 115 is expressed by $(D3^2 - D2^2)/4 \times \pi$. In FIG. 8, the pressure-receiving area of the condensing lens-holding portion 103 is formed to be equal to the pressure-receiving area of the annular gas sub-chamber 115. Therefore, a force which the condensing lens-holding portion 103 receives is offset by a force which the annular gas sub-chamber 115 receives. Accordingly, the force required for maintain the condensing lens-holding portion 103 at the present position by the actuator 106 or for moving it under a condition pressurized with the assist gas by the actuator 106 is relatively small.

When the processing with a laser beam ends, the assist gas is no longer fed from the source of assist gas. The assist gas in the laser processing head chamber 108 is released from the nozzle hole 111, and the pressure in the laser processing head chamber 108 gradually decreases. Similarly, the assist gas in the annular gas sub-chamber 115 flows into the laser processing head chamber 108 through the branch passage 142 and the feed passage 119 and is similarly released from the nozzle hole 111.

However, the laser processing head 114 of the prior art as disclosed in the Japanese Patent Publication No. 2804206 is provided with the annular gas sub-chamber 115 and necessitates the branch passage 142 for feeding the assist gas or the compressed air into the annular gas sub-chamber 115. Therefore, the structure of the laser processing head 114 as a whole becomes complex. When the annular gas sub-chamber 115 is provided, further, it becomes difficult to maintain a balance of pressure between the laser processing head chamber 108 and the annular gas sub-chamber 115.

Further, when the processing with the laser beam ends and-the pressure decreases in the laser processing head chamber 108, it becomes necessary to pass the assist gas in the annular gas sub-chamber 115 into the laser processing head chamber 108 through the branch passage 142 and the feed passage 119. Therefore, a considerable period of time is necessary for decreasing the pressure in the annular gas sub-chamber 115.

Further, when the type of processing of the laser-machine is to be changed, the kind of assist gas is often changed, e.g., an assist gas which is oxygen is changed to nitrogen. In changing the assist gas, the gas remaining in the annular gas sub-chamber 115 must be released. Similarly, therefore, a considerable period of time is required for changing the assist gas.

The present invention was accomplished in view of the above circumstances, and has an object of providing a laser processing head which enables the condensing optical system-holding means or the nozzle-holding means to be moved with a small force without providing an annular gas sub-chamber and/or a branch passage for the annular gas sub-chamber.

SUMMARY OF THE INVENTION

In order to achieve the above object according in a first aspect of the present invention, there is provided a laser processing head comprising:

nozzle-holding means for holding a nozzle in which a nozzle hole is formed;

condensing optical system-holding means for holding a condensing optical system, the condensing optical system-holding means being slidably arranged in the nozzle-holding means while maintaining sealing;

moving means for slide-moving the nozzle-holding means and the condensing optical system-holding means relative to each other;

assist-gas feeding means for feeding an assist gas into a laser processing head chamber formed between the condensing optical system of the condensing optical system-holding means and the nozzle hole of the nozzle-holding means;

passages formed in the nozzle-holding means to communicate the laser processing head chamber with the exterior of the nozzle-holding means;

slide members that slide in the passages maintaining sealing; and coupling means for coupling the slide members to the condensing optical system-holding means.

That is, in the first aspect of the invention, when the pressure increases in the laser processing head chamber due to the assist gas, the forces act onto the condensing optical system-holding means and onto the slide members in the directions opposite to each other. As the slide members and the condensing optical system-holding means are integrally coupled together, the forces acting on the condensing optical system-holding means and on the slide members balance each other. As a result, the condensing optical system-holding means or the nozzle-holding means can be moved by a small force produced by the moving means without the annular gas sub-chamber nor the branch passage for the annular gas sub-chamber. According to the first aspect, further, neither the annular gas sub-chamber nor the branch passage for the annular gas sub-chamber is provided and, hence, the structure of the laser processing head is simplified and the assist gas can be changed within a short period of time.

A second aspect of the invention is concerned with the first aspect of the invention, wherein projected areas of the slide members on the side of the laser processing head chamber on a plane perpendicular to the direction in which the slide members slide, are selected to be equal to a projected area of the condensing optical system-holding means on the side of the laser processing head chamber on a plane perpendicular to the optical axis of an optical passage between the condensing optical system and the nozzle hole.

That is, according to the second aspect of the invention, an equal force acts on the condensing optical system-holding means and on the slide members due to the assist gas. Therefore, these forces can be completely balanced, and a very small force must be produced by the moving means.

A third aspect of the invention is concerned with the first aspect or the second aspect, wherein the coupling means is at least one rod.

A fourth aspect of the invention is concerned with the first aspect or the second aspect, wherein the coupling means is a portion of the condensing optical system-holding means in which at least one through hole is formed.

That is, according to the third and fourth aspects of the invention, the laser processing head can be formed in a relatively simple constitution.

According to a fifth aspect of the present invention, there is provided a laser processing head comprising:

nozzle-holding means for holding a nozzle in which a nozzle hole is formed;

condensing optical system-holding means for holding a condensing optical system, the nozzle-holding means being slidably arranged in the condensing optical system-holding means while maintaining sealing;

moving means for slide-moving the nozzle-holding means and the condensing optical system-holding means relative to each other;

assist-gas feeding means for feeding an assist gas into a laser processing head chamber formed between the condensing optical system of the condensing optical system-holding means and the nozzle hole of the nozzle-holding means;

passages formed in the nozzle-holding means to communicate the laser processing head chamber with the exterior of the nozzle-holding means;

slide members that slide in the passages while maintaining sealing; and coupling means for coupling the slide members to the nozzle-holding means.

That is, in the fifth aspect of the invention, when the pressure increases in the laser processing head chamber due to the assist gas, the forces act on the nozzle-holding means and on the slide members in the directions opposite to each other. As the slide members and the nozzle-holding means are integrally coupled together, the forces acting onto the nozzle-holding means and onto the slide members balance each other. As a result, the condensing optical system-holding means or the nozzle-holding means can be moved by a small force produced by the mooing means without the annular gas sub-chamber nor the branch passage for the annular gas sub-chamber. According to the fifth aspect, further, neither the annular gas sub-chamber nor the branch passage for the annular gas sub-chamber is provided and, hence, the structure of the laser processing head is simplified and the assist gas can be changed over within a short period of time.

A sixth aspect of the invention is concerned with the fifth aspect of the invention, wherein the projected areas of the slide members, on the side of the laser processing head chamber on a plane perpendicular to the direction in which the slide members slide, are selected to be equal to a projected area of the nozzle-holding means on the side of the laser processing head chamber on a plane perpendicular to the optical axis of an optical passage between the condensing optical system and the nozzle hole.

That is, according to the sixth aspect of the invention, an equal force acts on the nozzle-holding means and on the slide members due to the assist gas. Therefore, these forces can be completely balanced, and a very small force must be produced by the moving means.

A seventh aspect of the invention is concerned with any one of the first to sixth aspect of the invention, wherein an assist gas feed port in the laser processing head chamber fed with the assist gas from the assist gas feed means is positioned on the outer side of the coupling means when viewing from the optical axis of the optical passage between said condensing optical system and said nozzle hole.

That is, according to the seventh aspect of the invention, the assist gas is fed from the outer peripheral portion of the laser processing head chamber at the time of changing the kind of the assist gas. Thus, the assist gas can be replaced in a short time.

An eighth aspect of the invention is concerned with any one of the fifth to seventh aspect of the invention, wherein the coupling means is a wire engaged around a pulley provided in-the condensing optical system-holding means.

That is, according to the eighth aspect of the invention, the laser processing head can be formed in a relatively simple constitution.

According to a ninth aspect of the invention, there is provided a laser processing head comprising:

nozzle-holding means for holding a nozzle in which a nozzle hole is formed;

condensing optical system-holding means for holding a condensing optical system, the condensing optical system-holding means being slidably arranged in the nozzle-holding means while maintaining sealing;

moving means for slide-moving the nozzle-holding means and the condensing optical system-holding means relative to each other;

assist-gas feeding means for feeding an assist gas into a laser processing head chamber formed between the condensing optical system of the condensing optical system-holding means and the nozzle hole of the nozzle-holding means;

a fluid chamber formed between the condensing optical system-holding means and the nozzle-holding means;

a passage for communicating the fluid chamber with the laser processing head chamber; and a slide member that slides in the passage maintaining sealing;

wherein the volume of the fluid chamber increases when the condensing optical system-holding means moves in a direction in which the volume of the laser processing head chamber decreases; and a non-compressible fluid is filled between the fluid chamber and the slide member in the passage.

That is, in the ninth aspect of the invention, the pressure in the laser processing head chamber increased due to the assist gas is transmitted to the fluid in the passage through the slide member and, hence, the pressure increases in the fluid chamber. Therefore, a force acts on the condensing optical system-holding means in a direction in which the volume of the laser processing head chamber decreases. The direction of the force is opposite to the direction of the force acting on the condensing optical system-holding means due to the laser processing head chamber. Therefore, these forces balance each other. As a result, the condensing optical system-holding means or the nozzle-holding means can be moved by a small force produced by the moving means without the branch passage for the annular gas sub-chamber. According to the ninth aspect, further, the branch passage for the annular gas sub-chamber is not provided and, hence, the structure of the laser processing head is simplified and the assist gas can be changed over within a short period of time.

A tenth aspect of the invention is concerned with the ninth aspect of the invention, wherein the passage is formed in the nozzle-holding means.

An eleventh aspect of the invention is concerned with the ninth aspect of the invention, wherein the passage is formed in the condensing optical system-holding means.

That is, according to the tenth or eleventh aspect of the invention, the laser processing head can be formed in a relatively simple constitution.

The above objects, features, advantages as well as other objects, features and advantages of the invention will become obvious from the following detailed description of representative embodiments of the invention in conjunction with the accompanying drawings.

DETAILED DESCRIPTION

Figure 1:
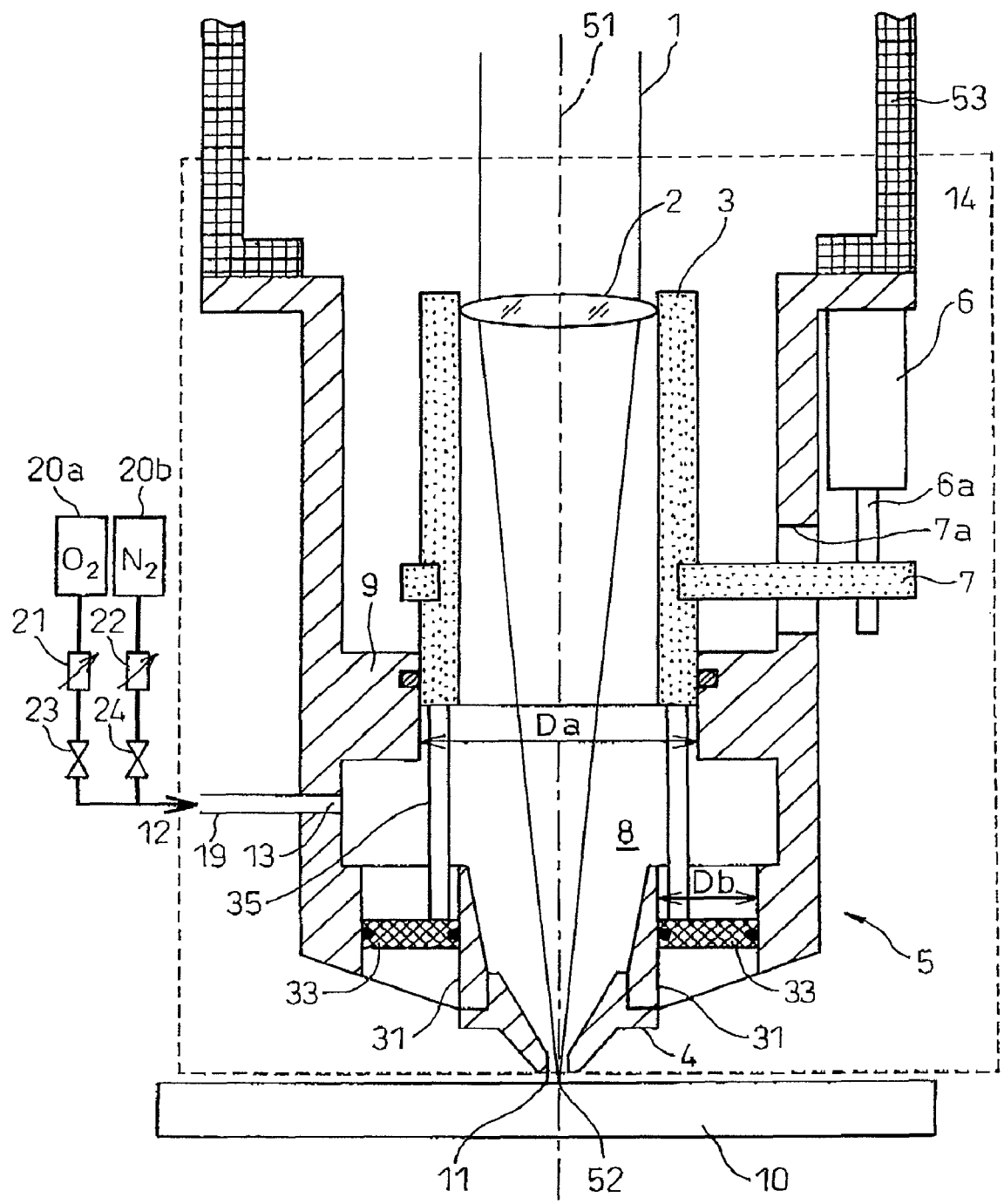
FIG. 1 is a sectional view in the longitudinal direction of a laser processing head according to a first embodiment of the present invention.

Embodiments of the invention will be described below with reference to the accompanying drawings. In the drawings, the similar members are denoted by the same reference numerals. For ease of comprehension, the drawings have arbitrary scales.

FIG. 1 is a sectional view in the longitudinal direction of a laser processing head according to a first embodiment of the present invention. The laser processing head 14 shown in FIG. 1 is constituted mainly by a cylindrical nozzle-holding portion 5 for holding a nozzle 4 in which a nozzle hole 11 is formed and a cylindrical condensing lens-holding portion 3 for holding a condensing optical system such as a condensing lens 2. The nozzle-holding portion 5 is fixed to a main body 53. The condensing lens 2 is held near the upper edge of the condensing lens-holding portion 3, and has a diameter of, for example, about 25 mm to about 63 mm. The nozzle hole 11 in the nozzle-holding portion 5 has a diameter of about 0.5 mm to about 6 mm. A closed space called a laser processing head chamber 8 is formed between the condensing lens 2 and the nozzle hole 11.

As shown, an annular protrusion 9 is protruded from the inner peripheral surface of the nozzle-holding portion 5. The outer peripheral surface of the condensing lens-holding portion 3 is engaged with the annular laser processing head 9; the condensing lens-holding portion 3 is so arranged as to slide in the nozzle-holding portion 5.

A relatively large opening portion 7a is formed in the outer peripheral surface of the nozzle-holding portion 5. A coupling portion 7 provided on the condensing lens-holding portion 3 is extending through the opening portion 7a and is coupled to a piston 6a of an actuator 6 arranged on the outer side of the nozzle-holding portion 5. It is presumed here that the actuator 6 is connected to a control unit of a laser machine that is not shown. As the piston 6a of the actuator 6 moves up and down, the condensing lens-holding portion 3 slides up and down in the nozzle-holding portion 5 so that a focusing point is adjusted on a work 10 that is to be processed. A sliding distance of the condensing lens-holding portion (nozzle-holding portion 5 in the case of a second embodiment appearing later) by the actuator 6 is about 20 mm at the greatest. Though not described in detail, the members that undergo the sliding motion in this specification are all provided with a sealing member and can sealably slide.

An assist gas feed port 13 communicating with the laser processing head chamber 8 is formed in the inner peripheral surface of the nozzle-holding portion 5. Assist gases from assist gas sources 20a, 20b arranged on the outer side of the laser processing head 14 are fed into the laser processing head chamber 8 through a passage 12, a feed passage 19 and the assist gas feed port 13. The assist gases are fed at all times during the processing with the laser beam and, hence, a predetermined high pressure is maintained in the laser processing head chamber 8.

In FIG. 1, the assist gas source 20a is an oxygen source and the assist gas source 20b is a nitrogen source. Depending upon the type of laser beam processing on the to-be-processed work 10, however, there can be used any other assist gas source, such as argon, air, helium, or adjusted air containing nitrogen or oxygen at an increased concentration, or a source of mixed gas containing a plurality of gases.

In the embodiment shown in FIG. 1, the nozzle-holding portion 5 surrounding the nozzle 4 has a thickness greater than that of other portions. A plurality (two in FIG. 1) of passages 31 are formed around the nozzle 4 to communicate the interior of the laser processing head camber 8 with the exterior of the nozzle-holding portion 5. Further, slide members 33 are arranged in the passages 31 to slide therein, respectively. As shown, further, the slide members 33 are coupled to the lower end of the condensing lens-holding portion 3 by rods 35 arranged in the laser processing head chamber 8. That is, as shown, the laser processing head chamber 8 is arranged between the condensing lens-holding portion 3 and the slide members 33. Further, the one surface of each slide member 33 is exposed to the machining head chamber 8, and the other surface of each slide member 33 is exposed to the surrounding air on the outer side of the laser processing head 14. The rods 35 have a diameter which is small enough to be arranged in the thickness portion of the condensing lens-holding portion 3, and a predetermined gap is formed between the rods 35 and the annular protrusion 9.

In a direction perpendicular to an optical axis 51 of a laser beam 1 passing through the nozzle-holding portion and the condensing lens-holding portion 3 as shown in FIG. 1, at least a portion of the passage 31 is positioned corresponding to a region of the condensing lens-holding portion 3. In FIG. 1, therefore, it is possible to use linear rods 35.

In the embodiment shown in FIG. 1, the condensing lens-holding portion 3 and the slide members 33 slide integrally together due to the rods 35. Therefore, when the condensing lens-holding portion 3 slides to decrease the volume of the laser processing head chamber 8, the slide members 33 slide down to increase the volume of the laser processing head chamber 8.

At the time of using the laser processing head 14, the to-be-processed work 10 is arranged at a predetermined position. The laser processing head 14 is, then, positioned above the to-be-processed work 10 by a Z-axis actuator that is not shown and, thereafter, the position of the condensing lens-holding portion 3 is adjusted by the actuator 6. Thereafter, a switching valve 23 is opened and an assist gas such as oxygen from the one assist gas source 20a passes through a pressure regulator 21 and flows into the passage 12. The assist gas flows through the feed passage 19 and is fed into the laser processing head chamber 8 through the assist gas feed port 13. Therefore, the pressure in the laser processing head chamber 8 increases up to, for example, 1 MPa. The pressure of space on the side opposite to the laser processing head chamber 8 relative to the condensing lens 2 is the atmospheric pressure.

When the pressure in the laser processing head chamber 8 increases, an upward force acts on the condensing lens-holding portion 3. Here, the laser processing head chamber 8 is arranged between the condensing lens-holding portion 3 and the slide members 33. When the pressure in the laser processing head chamber 8 increases, therefore, a downward force acts on the slide members 33. That is, forces in opposite directions act on the condensing lens-holding portion 3 and on the slide members 33, respectively. In the embodiment that is shown, however, the condensing lens-holding member 3 and the slide members 33 are integrally coupled together by rods 35, and the forces acting on the condensing optical system-holding means and on the slide members balance each other.

Next, at the time of processing with a laser beam, a laser beam 1 is input to the laser processing head 14 from a laser oscillator that is not shown, and is focused by the condensing lens 2 on a focal point 52 on the to-be-processed work 10. At the focal point 52, therefore, the to-be-processed work 10 is suitably machined or welded with the laser beam. To suitably adjust the focal point 52, therefore, it is necessary to finely adjust the condensing lens-holding portion 3 up and down by the actuator 6. In the present invention, forces acting on the condensing lens-holding portion 3 and on the nozzle-holding portion 5 are offset by each other. Therefore, the actuator 6 needs produce a relatively small force to move the condensing lens-holding portion 3 up and down.

Referring to FIG. 1, further, if the inner diameter of the annular protrusion 9 is denoted by Da and the diameter of the slide members 33 which are of a circular shape by Db, then, the pressure-receiving area of the condensing lens-holding portion 3 is given by $Da^2/4 \times \pi$, and the sum of the pressure-receiving areas of the two slide members 33 is given by $2 \times Db^2/4 \times \pi$. In the first embodiment, it is desired that the pressure-receiving area of the condensing lens-holding portion 3 equals the sum of the pressure-receiving areas of the two slide members 33. In other words, it is desired that the sum of projected areas of the two slide members 33 on the side of the laser processing head chamber 8 on a plane perpendicular to the direction in which the slide members 33 slide, is equal to the projected area of the condensing lens-holding portion 3 on the side of the laser processing head chamber 8 on a plane perpendicular to the optical axis 51 of the laser beam 1 between the condensing lens 2 and the nozzle hole 11.

A force, based on a difference between the pressure in the laser processing head chamber 8 and the atmospheric pressure, is applied to these pressure-receiving areas. If these pressure-receiving areas are equal, therefore, the forces acting on the condensing lens-holding portion 3 and on the slide members 33 completely balance and, hence, the actuator 6 needs to produce a very small force for moving the condensing lens-holding portion 3 up and down.

Here, during the processing with the laser beam, it may often happen that the assist gas is changed, for example, from oxygen to nitrogen, accompanying a change in the processing condition. In such a case, the switching valve 23 is closed to discontinue the supply of oxygen from the assist gas source 20a. Therefore, the assist gas in the laser processing head chamber 8 is released from the nozzle hole 11, and the pressure decreases in the laser processing head chamber 8. Next, a switching valve 24 is opened to feed nitrogen from the assist gas source 20b into the laser processing head chamber 8. The embodiment shown in FIG. 1 is provided with neither the annular gas sub-chamber nor the branch passage for the annular gas sub-chamber (refer to FIG. 8). Therefore, the laser processing head is simple in structure. Besides, the assist gas before being changed does not remain in the annular gas sub-chamber and/or in the branch passage for the annular gas sub-chamber. This enables the assist gas to be quickly changed and allows the laser machine to have improved productivity.

When the processing with the laser beam ends, the switching valve 24 is closed, and the assist gas is no longer fed from the assist gas source 20b. The assist gas in the laser processing head chamber 8 is released from the nozzle hole 11, and the pressure gradually decreases in the laser processing head chamber 8. In this case, too, there is provided neither the annular gas sub-chamber nor the branch passage for the annular gas sub-chamber (FIG. 8), and the assist gas can be quickly released.

Figure 2:
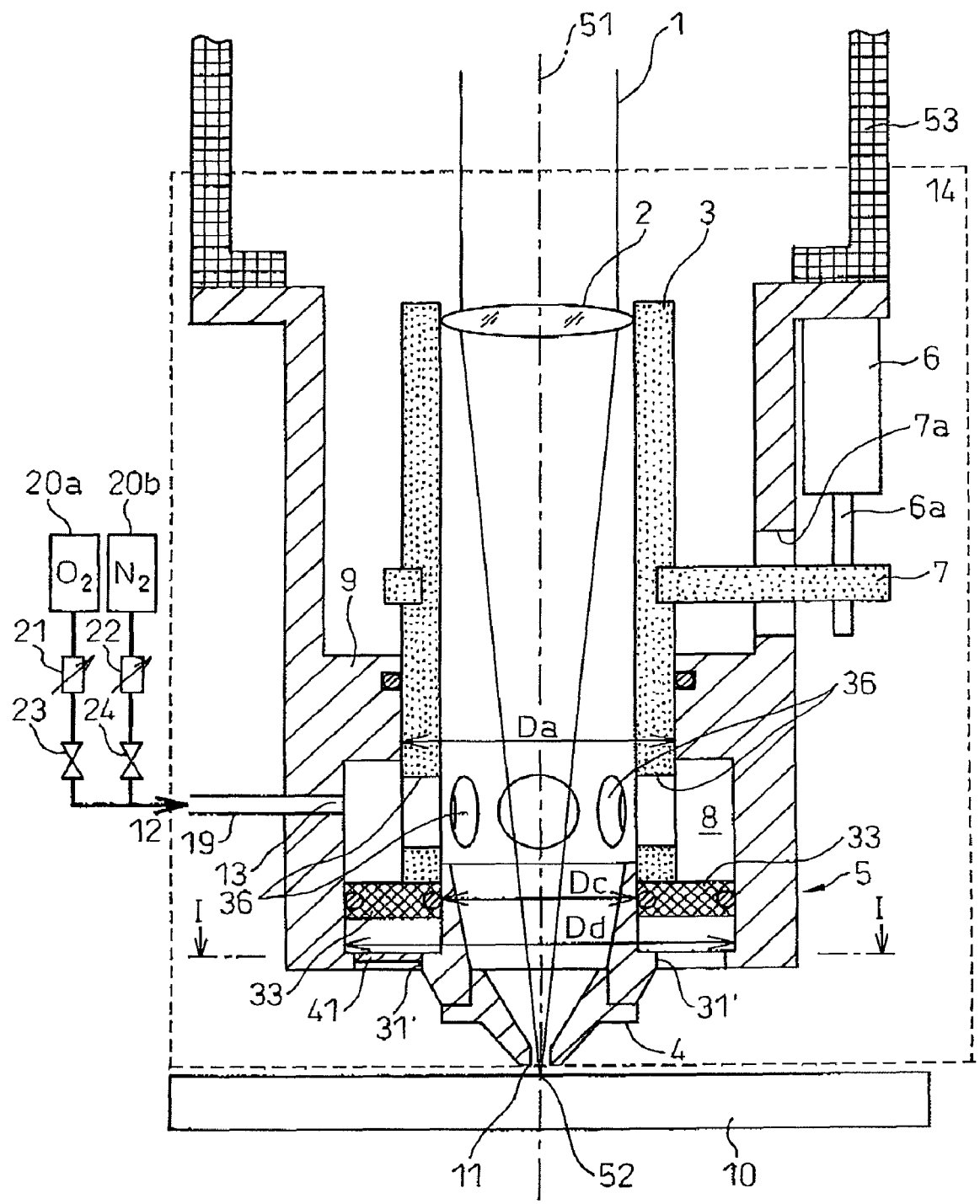
FIG. 2 is a view similar to FIG. 1 and illustrates a modified example of the first embodiment.

FIG. 2 is a view similar to FIG. 1 and illustrates a modified example of the first embodiment. Described below are mainly the points different from those of FIG. 1. In FIG. 2, the rods 35 are removed and, instead, the condensing lens-holding portion 3 is extending downward beyond the annular protrusion 9. A plurality of through holes 36 are formed at an equal distance in the circumferential direction in the peripheral surface of the extended portion of the condensing lens-holding portion 3. It is desired that the through holes 36 have a size large enough for the assist gas to be entirely released without remaining between the condensing lens-holding portion 3 and the nozzle-holding portion 5.

Figure 3:
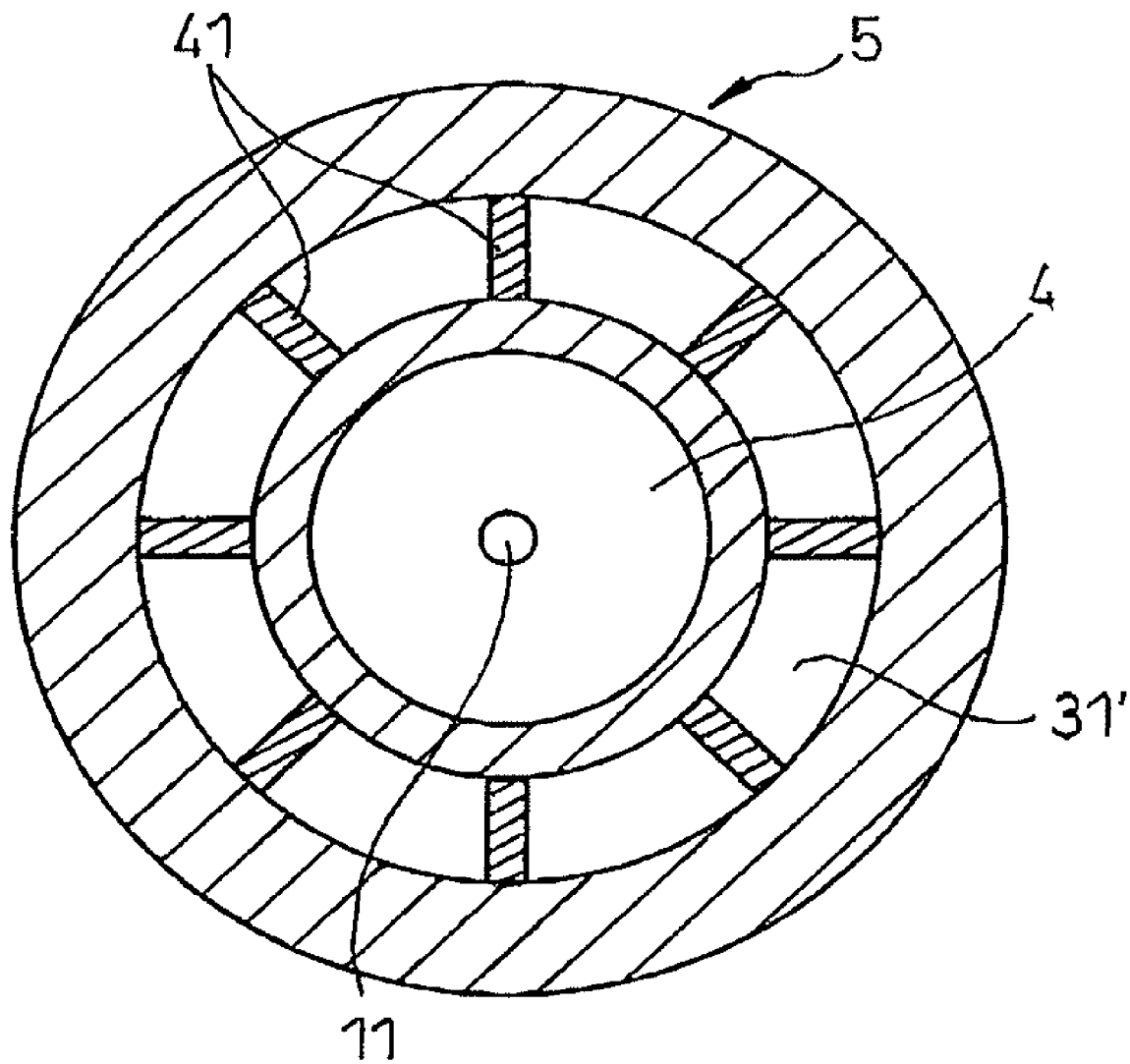
FIG. 3 is a sectional view along the line I-I in FIG. 2.

FIG. 3 is a sectional view along the line I-I in FIG. 2. In this modified example as will be understood from FIGS. 2 and 3, annular through hole 31' is formed surrounding the nozzle 4. A plurality of support rods 41 extending in the radial direction are arranged near the lower ends of the through hole 31'. The support rods 41 function to support the nozzle 4 of the nozzle-holding portion 5.

Reverting to FIG. 2, the outer diameter of the nozzle 4 in the laser processing head chamber 8 substantially corresponds to the inner diameter of the condensing lens-holding portion 3. The annular slide member 33 corresponding to the shape of the through hole 31' is directly coupled to the lower end of the condensing lens-holding portion 3.

In the modified example shown in FIG. 2, the condensing lens-holding portion 3 and the slide members 33 slide integrally together. Therefore, when the condensing lens-holding portion 3 slides down to decrease the volume of the laser processing head chamber 8, the slide members 33 slide down to increase the volume of the machining head chamber 8. Thus, the modified example shown in FIG. 2 exhibits the same effect as the one described above.

In FIG. 2, if the inner diameter of the annular protrusion 9 is denoted by Da, the outer diameter of the nozzle 4 by Dc and the inner diameter of the nozzle-holding portion 5 by Dd, then, the pressure-receiving area of the condensing lens-holding portion 3 is given by $Da^2/4\times\pi$, and the pressure-receiving areas of the slide members 33 are given by $(Dd^2/4\times\pi - Dc^2/4\times\pi)$. When the pressure-receiving area of the condensing lens-holding portion 3 is equal to the pressure-receiving areas of the slide members 33, the forces acting on the condensing lens-holding portion 3 and on the slide members 33 can be completely offset in the same manner as described above and, hence, the actuator 6 needs produce a very small force.

Figure 4:
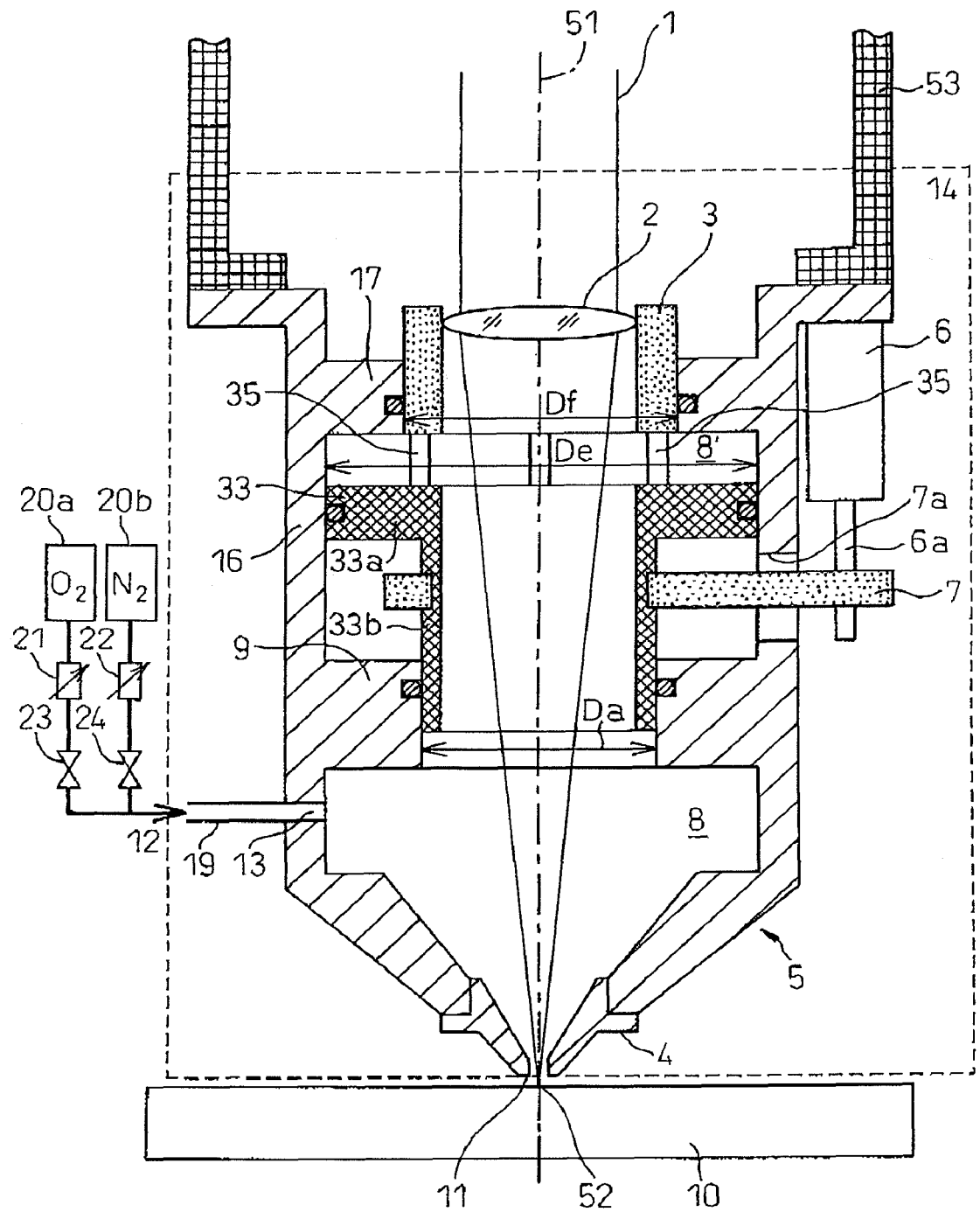
FIG. 4 is a view similar to FIG. 1 and illustrates another modified example of the first embodiment.

FIG. 4 is a view similar to FIG. 1 and illustrates another modified example of the first embodiment. In FIG. 4, the upper annular protrusion 17 is formed over the annular protrusion 9, and the condensing lens-holding portion 3 slides in the upper annular protrusion 17.

In FIG. 4, the slide member 33 is arranged in concentric with the condensing lens-holding portion 3, and is constituted by a flange 33a and a sleeve 33b extending from the flange 33a. The end of the flange 33a is sized to engage with the inner peripheral surface of the nozzle-holding portion 5. The flange 33a of the slide member 33 slides between the upper annular protrusion 17 and the lower annular protrusion 9. Further, the sleeve 33b is sized to slide along the inner peripheral surface of the annular protrusion 9.

The coupling portion 7 attached to the piston 6a of the actuator 6 is coupled to the sleeve 33b of the slide member 33. As shown, the plurality of rods 35 couple the condensing lens-holding portion 3 to the slide member 33. Therefore, the condensing lens-holding portion 3, rods 35 and slide member 33 slide integrally together.

When the condensing lens-holding portion 3 slides down to decrease the volume of the laser processing head chamber 8, in this case, the slide member 33 slides toward the lower annular protrusion 9 between the upper annular protrusion 17 and the lower annular protrusion 9. The space 8' between the upper annular protrusion 17 and the slide member 33 increases due to the above sliding action. In the case of FIG. 4, too, therefore, when the condensing lens-holding portion 3 slides down to decrease the volume of the laser processing head chamber 8, it can be said that the slide member 33 slides down to increase the volume of the laser processing head chamber 8. Thus, the modified example shown in FIG. 4, too, exhibits the same effect as the one described above.

In FIG. 4, if the inner diameter of the annular protrusion 9 is denoted by Da, the inner diameter of the upper annular protrusion 17 by Df and outer diameter of the flange 33a by De, then, the pressure-receiving area of the condensing lens-holding portion 3 is given by $Df^2/4\times\pi$, and the pressure-receiving area of the slide member 33 is given by $(De^2/4\times\pi - Da^2/4\times\pi)$. When the pressure-receiving area of the condensing lens-holding portion 3 is equal to the pressure-receiving area of the slide member 33, the forces acting on the condensing lens-holding portion 3 and on the slide member 33 can be completely offset in the same manner as described above and, hence, the actuator 6 needs to produce a very small force.

Figure 5:
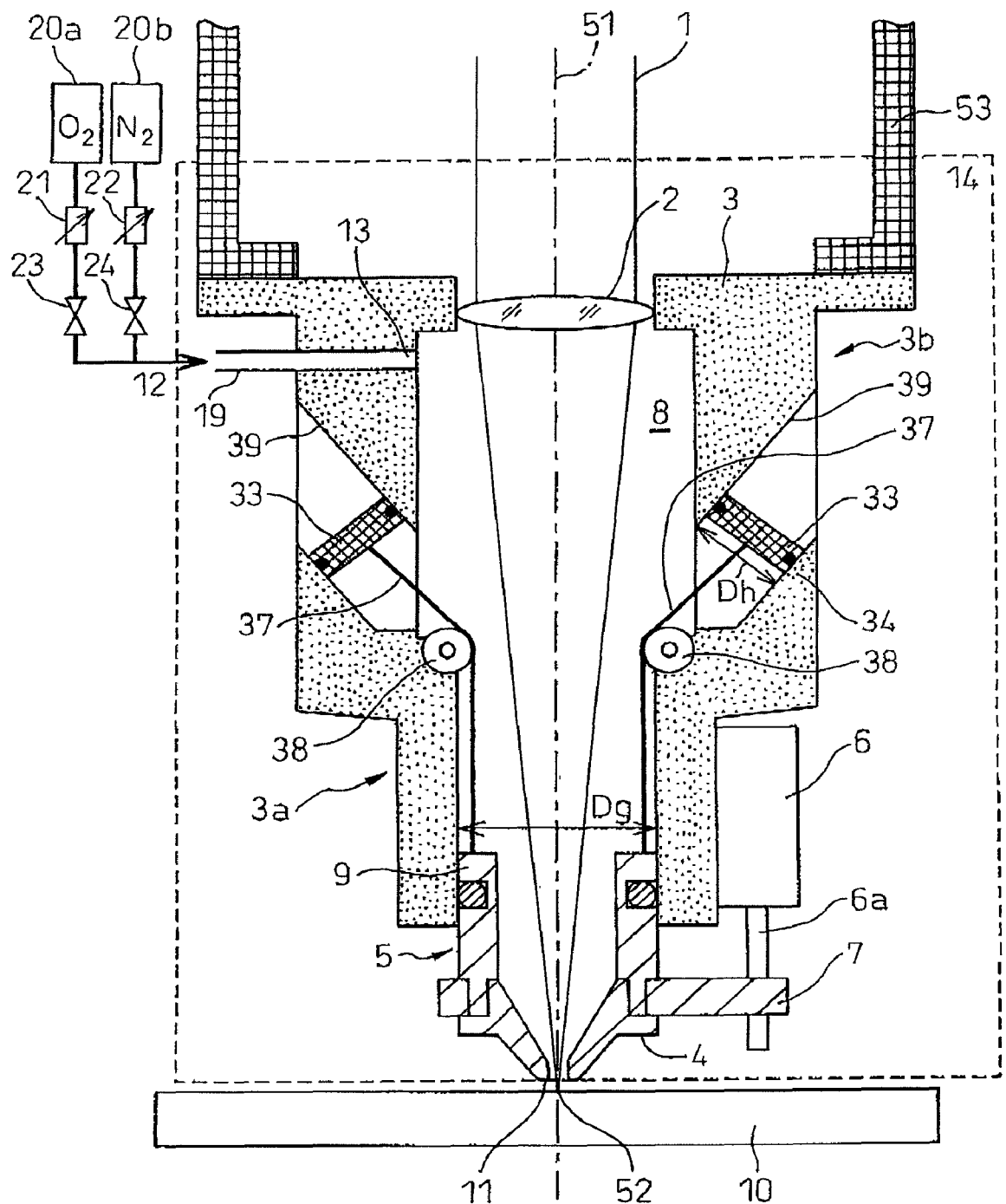
FIG. 5 is a sectional view in the longitudinal direction of the laser processing head according to a second embodiment of the present invention.

FIG. 5 is a sectional view in the longitudinal direction of the laser processing head according to a second embodiment of the present invention. As shown in FIG. 5, the condensing lens-holding portion 3 is fixed to the main body 53. The end of the condensing lens-holding portion 3 is formed as a narrow portion 3a narrower than a broad portion 3b which holds the condensing lens 2. The inner diameter of the narrow portion 3a is substantially corresponding to the outer diameter of the nozzle-holding portion 5, and the coupling portion 7 attached to the piston 6a of the actuator 6 is coupled to the nozzle-holding portion 5. According to the second embodiment constituted as described above, the nozzle-holding portion 5 slides along the inner peripheral surface of the condensing lens-holding portion 3. Further, the feed passage 19 and the assist gas feed port 13 for feeding the assist gas are formed in the broad portion 3b of the condensing lens-holding portion 3.

As shown, a plurality of, for example, two passages 39 extending aslant relative to the optical axis 51 are formed in the thickness portion of the broad portion 3b. As will be understood from FIG. 5, a level increases from the nozzle hole 11 toward the condensing lens 2 with increasing distance between the passages 39.

The slide members 33 are slidably arranged in the passages 39. Pulleys 38 are provided at the inner shoulder portions between the broad portion 3b and the narrow portion 3a. Wires 37 are coupling the slide members 33 to the nozzle-holding portion 5 via the pulleys 38 in the laser processing head chamber 8. Therefore, the slide members 33, wires 37 and nozzle-holding portion 5 slide integrally together.

When the nozzle-holding portion 5 slides down to increase the volume of the laser processing head chamber 8, the slide members 33 slide downward and slantingly in the passages 39 to decrease the volume of the laser processing head chamber 8. Further, the laser processing head chamber 8 has been pressurized with the assist gas during the processing with the laser beam. When the nozzle-holding portion 5 slides up to decrease the volume of the laser processing head chamber 8, therefore, the slide members 33 slide upward and slantingly in the passages 39 to increase the volume of the laser processing head chamber 8. Thus, the modified example shown in FIG. 5 exhibits the same effect as the one described above.

In FIG. 5, if the inner diameter of the narrow portion 3a of the condensing lens-holding portion 3 is denoted by Dg and the diameter of the slide members 33, which are of a circular shape, by Dh, then, the pressure-receiving area of the nozzle-holding portion 5 is given by $Dg^2/4\times\pi$, and the pressure-receiving areas of the members 33 are given by $2\times Dh^2/4\times\pi$. When the laser processing head chamber 8 is pressurized with the assist gas, a force determined by the assist gas pressure (gauge pressure) and the pressure-receiving areas acts on the nozzle-holding portion 5 and on the slide members 33, respectively.

It is desired that the pressure-receiving area of the nozzle-holding portion 5 equals the pressure-receiving areas of the slide members 33. In other words, it is desired that the sum of projected areas of the two slide members 33 on the side of the laser processing head chamber 8 on a plane perpendicular to the direction in which the slide members 33 slide, is equal to the projected area of the nozzle-holding portion 5 on the side of the laser processing head chamber 8 on a plane perpendicular to the optical axis 51 between the condensing lens 2 and the nozzle hole 11. In this case, the forces acting on the nozzle-holding portion 5 and on the slide members 33 can be completely offset in the same manner as described above and, hence, the actuator 6 needs to produce a very small force.

As will be understood from the second embodiment shown in FIG. 5, the direction in which the slide members 33 slide is not limited to the direction of optical axis 51 but may be slantingly relative to the optical axis 51. Further, when the force of the slide members 33 is to be amplified by using a link mechanism and/or a gear mechanism which are not shown, it will be understood that the slide members 33 having smaller pressure-receiving areas may be used.

In the embodiments described with reference to FIGS. 1 to 5, further, the rods 35 or wires 37 and pulleys 38 are provided inside the laser processing head chamber 8. These members, however, may be provided on the outer side of the laser processing head chamber 8.

In the embodiments described with reference to FIGS. 1 to 5, the assist gas feed port 13 is positioned on the outer side of the rods 35, through holes 36 or a combination of the wires 37 and the pulleys 38 in the radial direction as viewed in the direction of the optical axis 51. When changing the assist gas from, for example, oxygen to nitrogen, the assist gas after being changed flows from the assist gas feed port 13 into the laser processing head chamber 8, while the residual assist gas before being changed is quickly released from the nozzle hole 11 at the center of the nozzle-holding portion 5. When changing the kind of the assist gas in these embodiments, therefore, the assist gas may be quickly replaced by feeding the assist gas from the peripheral portions of the machining head chamber.

Figure 6:
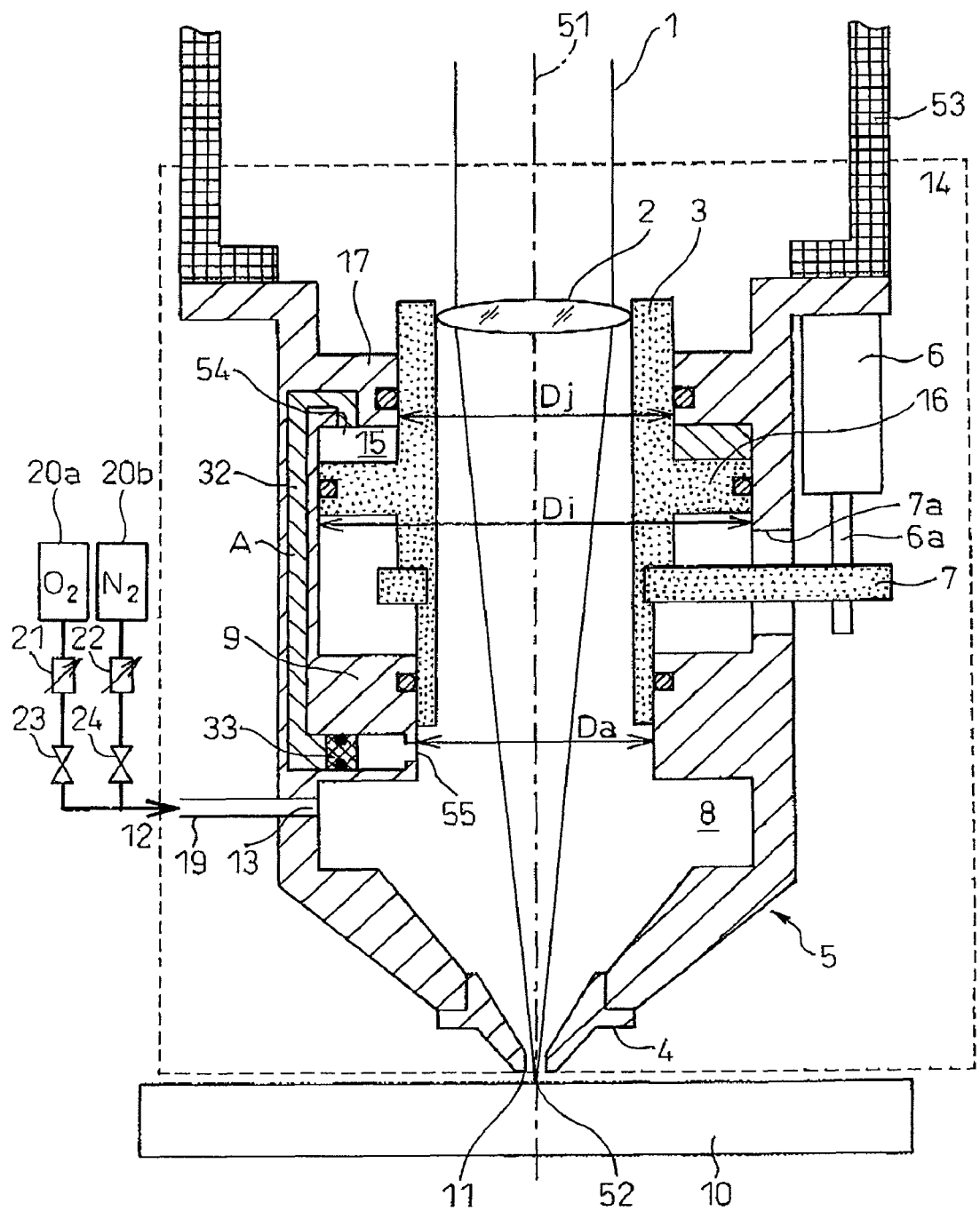
FIG. 6 is a sectional view in the longitudinal direction of the laser processing head according to a third embodiment of the present invention.

FIG. 6 is a sectional view in the longitudinal direction of the laser processing head according to a third embodiment of the present invention. In FIG. 6, the upper annular protrusion 17 and the lower annular protrusion 9 are protruded from the inner peripheral surface of the nozzle-holding portion 5. The outer peripheral surface of the condensing lens-holding portion 3 is engaged with both the upper annular protrusion 17 and the lower annular protrusion 9. The condensing lens-holding portion 3 is coupled to the piston 6a of the actuator 6 via the coupling portion 7 and slides in the nozzle-holding portion 5 being driven by the actuator 6.

As shown, flange 16 is provided on the outer surface of the condensing lens-holding portion 3. The end of the flange 16 is sized to engage with the inner peripheral surface of the nozzle-holding portion 5. The flange 16 is arranged between the upper annular protrusion 17 and the lower annular protrusion 9 of the condensing lens-holding portion 3. Further, a gap between the condensing lens-holding portion 3 and the nozzle-holding portion 5 is sealed with a sealing member and, hence, a fluid chamber 15 is formed between the upper end surface of the flange 16 and the lower end surface of the upper annular protrusion 17.

Further, an opening 54 of the fluid passage 32 is formed in the lower end surface of the upper annular protrusion 17. The fluid passage 32 extends from the upper annular protrusion 17 down to the lower annular protrusion 9 through the thickness portion of the nozzle-holding portion 5, is folded in a direction in which the lower annular protrusion 9 protrudes and ends at an opening 55 formed in the inner peripheral surface of the lower annular protrusion 9. A slide member 33 is slidably arranged in the fluid passage 32 in the lower annular protrusion 9. In the embodiment shown in FIG. 6, the fluid chamber 15 and the fluid passage 32 between the fluid chamber 15 and the slide member 33 are filled with a non-compressible fluid A such as a liquid. As shown, the opening 55 is formed to be slightly smaller than the cross-section of the fluid passage 32, so that the fluid member 33 will not escape from the fluid passage 32.

The fluid chamber 15 is so constituted as to expand and contract in the direction of the optical axis 51. When the condensing lens-holding portion 3 slides down to decrease the volume of the laser processing head chamber 8, the volume of the fluid chamber 15 increases. In other words, when the fluid chamber 15 is pressurized, the condensing lens-holding portion 3 receives a force in a direction toward the nozzle hole 11 due to the flange 16. Further, the fluid chamber 15 is of a structure that receives the atmospheric pressure only and is not affected by the pressure in the laser processing head chamber 8 because the fluid chamber 15 and the fluid passage 32 have been filled with the non-compressible fluid A.

In the third embodiment shown in FIG. 6, when the laser processing head chamber 8 is pressurized by feeding the assist gas through the assist gas feed port 13, an upward force acts on the condensing lens-holding portion 3. On the other hand, the force acting on the slide member 33 through the opening 55 further acts on the fluid chamber 15 through the fluid in the fluid passage 32 and in the fluid chamber 15, whereby the pressure in the fluid chamber 15 becomes substantially equal to the pressure in the laser processing head chamber 8. Therefore, the pressure in the fluid chamber 15 acts on the flange 16 of the condensing lens-holding portion 3; i.e., the condensing lens-holding portion 3 receives a downward force. When the condensing lens-holding portion 3 slides upward to increase the volume of the laser processing head chamber 8, therefore, a force acts on the condensing lens-holding portion 3 to slide it downward to decrease the volume of the laser processing head chamber 8.

In the third embodiment, therefore, the downward force acting on the pressure-receiving area $(Di^2-Dj^2)/4\times\pi$ of the flange 16 of the condensing lens-holding portion 3 is cancelled by the upward force acting on the pressure-receiving surface $Da^2/4\times\pi$ of the condensing lens-holding portion 3. Only a difference between these pressure-receiving areas acts on the condensing lens-holding portion 3. Therefore, the actuator 6 needs to produce only a small force for sliding the condensing lens-holding portion 3. In this case, too, it will be obvious that the actuator 6 needs to produce a very small force when the pressure-receiving area of the flange 16 is equal to the pressure-receiving area of the condensing lens-holding portion 3.

Besides, as the fluid chamber 15 and the fluid passage 32 have been filled with the non-compressible fluid A, there is no need of releasing the non-compressible fluid A even at the time of changing over the assist gas, and the operation for changing over the assist gas can be carried out within a short period of time. Further, the third embodiment does not require the branch passage for the annular gas sub-chamber that was provided on the outer side of the laser processing head in the related art, and the structure of the laser processing head can be simplified.

Figure 8:
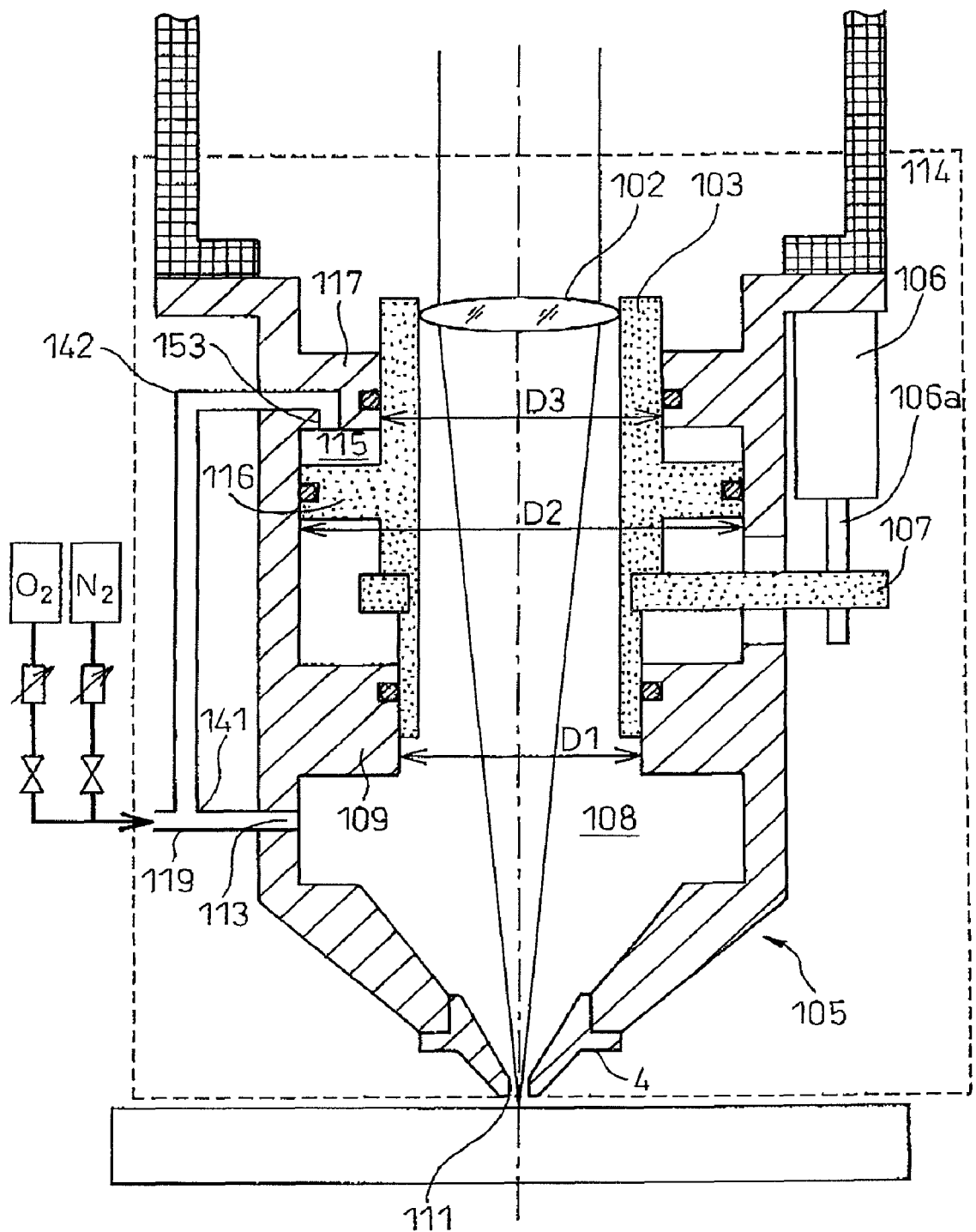
FIG. 8 is a sectional view in the longitudinal direction of a laser processing head according to a prior art.

When the slide member is arranged in the branch passage 142, the conventional laser processing head shown in FIG. 8 resembles the laser processing head of the third embodiment shown in FIG. 6. In the conventional laser processing head, however, the assist gas is fed into the annular gas sub-chamber 115, causing a defect of a large pressure drop between the assist gas feed port 113 and the branching portion 141. Further, use of the assist gas increases the range of motion for the slide member 33 resulting in an increase in the size of the laser processing head, which is a defect. In this connection, in the third embodiment the non-compressible fluid A fills the fluid passage 32 and in the fluid chamber 15, and the slide member needs possess a relatively small pressure-receiving area.

Figure 7:
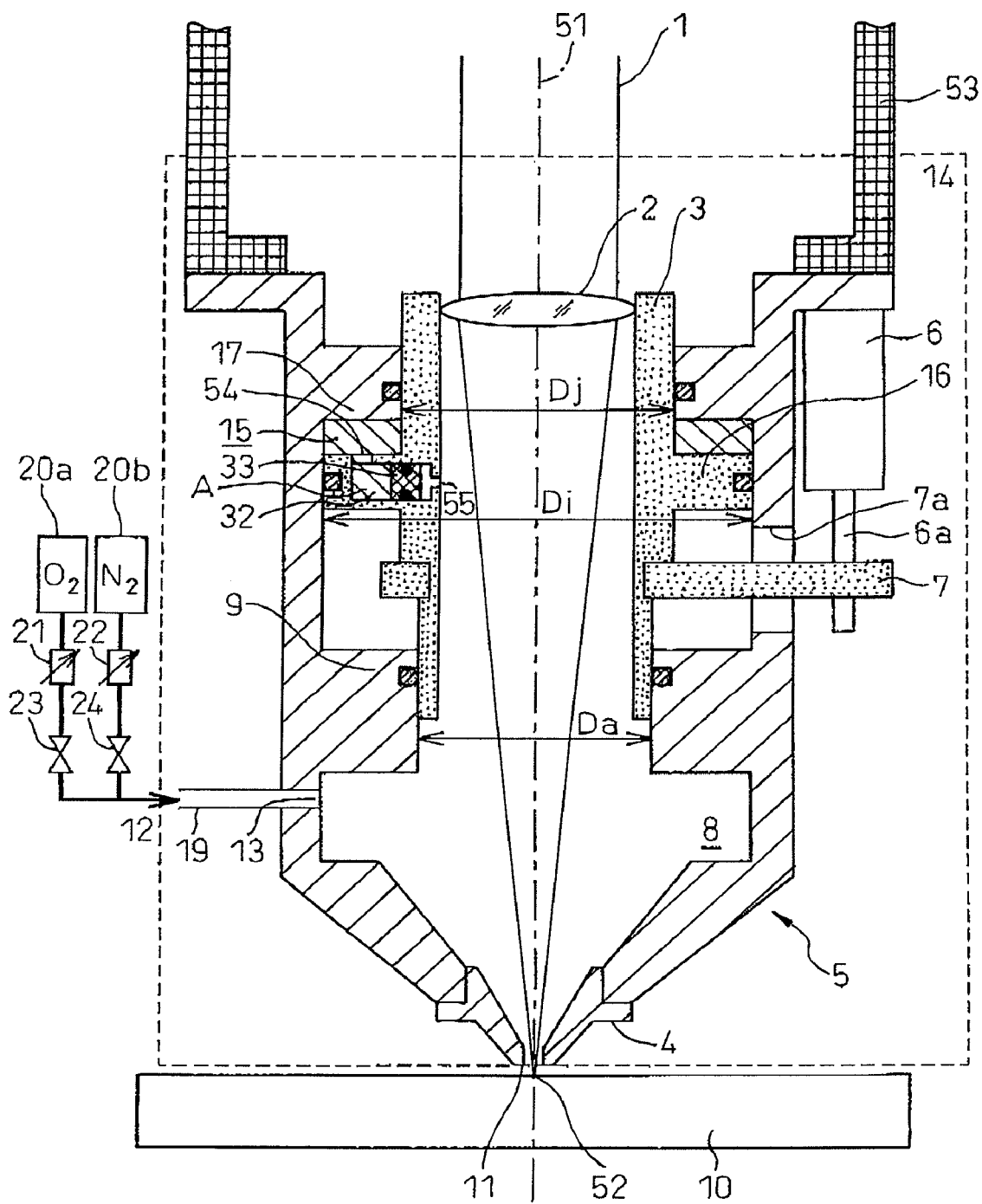
FIG. 7 is a view similar to FIG. 6 and illustrates a modified example of the third embodiment.

FIG. 7 is a view similar to FIG. 6 and illustrates a modified example of the third embodiment. In FIG. 7, the fluid passage 32 is formed in the flange 16 in the radial direction thereof. One end of the fluid passage 32 is opened as designated at 55 in the inner peripheral surface of the condensing lens-holding portion 3 and the other end thereof ends at an opening 54 formed at the upper end of the flange 16. As in the case of FIG. 6, the slide member 33 is slidably arranged in the fluid passage 32, and the fluid passage 32 and the fluid chamber 15 are filled with the non-compressible fluid A.

In the case shown in FIG. 7, too, when the force acts on the condensing lens-holding portion 3 so as to slide it upward causing an increase in the volume of the laser processing head chamber 8, the force also acts on the condensing lens-holding portion 3 so as to slide it downward so that the volume of the fluid chamber 15 decreases. Namely, the above forces balance each other. Even in the case shown in FIG. 7, therefore, it will be obvious that the effect same as the one described with reference to FIG. 6 is obtained. Here, suitable combinations of the above embodiments, too, will be encompassed in the scope of the invention as a matter of course.

Though the invention was described above by way of representative embodiments, it will be understood that people skilled in the art will be able to pursue the above-mentioned modifications, various other modifications, omission and addition without departing from the scope of the invention.

The invention claimed is:

1. A laser processing head comprising:
    nozzle-holding means for holding a nozzle in which a nozzle hole is formed;
    condensing optical system-holding means for holding a condensing optical system, said condensing optical system-holding means being slidably arranged in said nozzle-holding means while maintaining sealing;
    moving means for slide-moving said nozzle-holding means and said condensing optical system-holding means relative to each other;
    assist-gas feeding means for feeding an assist gas into a laser processing head chamber formed between said condensing optical system of said condensing optical system-holding means and said nozzle hole of said nozzle-holding means;
    passages formed in said nozzle-holding means to communicate said laser processing head chamber with the exterior of said nozzle-holding means;
    slide members that slide in said passages while maintaining sealing; and
    coupling means for coupling said slide members to said condensing optical system-holding means.

2. A laser processing head according to claim 1, wherein projected areas of said slide members on the side of said laser processing head chamber on a plane perpendicular to the direction in which said slide members slide, are selected to be equal to a projected area of said condensing optical system-holding means on the side of said laser processing head chamber on a plane perpendicular to the optical axis of an optical passage between said condensing optical system and said nozzle hole.

3. A laser processing head according to claim 1, wherein said coupling means is at least one rod.

4. A laser processing head according to claim 1, wherein said coupling means is a portion of said condensing optical system-holding means in which at least one through hole is formed.

5. A laser processing head comprising:
    nozzle-holding means for holding a nozzle in which a nozzle hole is formed;
    condensing optical system-holding means for holding a condensing optical system, said nozzle-holding means being slidably arranged in said condensing optical system-holding means while maintaining sealing;
    moving means for slide-moving said nozzle-holding means and said condensing optical system-holding means relative to each other;

assist-gas feeding means for feeding an assist gas into a laser processing head chamber formed between said condensing optical system of said condensing optical system-holding means and said nozzle hole of said nozzle-holding means;

passages formed in said nozzle-holding means to communicate said laser processing head chamber with the exterior of said nozzle-holding means;

slide members that slide in said passages while maintaining sealing; and coupling means for coupling said slide members to said nozzle-holding means.

6. A laser processing head according to claim 5, wherein projected areas of said slide members on the side of said laser processing head chamber on a plane perpendicular to the direction in which said slide members slide, are selected to be equal to a projected area of said nozzle-holding means on the side of said laser processing head chamber on a plane perpendicular to the optical axis of an optical passage between said condensing optical system and said nozzle hole.

7. A laser processing head according to claim 1, wherein an assist gas feed port in the laser processing head chamber fed with the assist gas from said assist gas feed means is positioned on the outer side of the coupling means when viewing from the optical axis of the optical passage between said condensing optical system and said nozzle hole.

8. A laser processing head according to claim 5, wherein said coupling means is a wire engaged around a pulley provided in said condensing optical system-holding means.

9. A laser processing head comprising:

nozzle-holding means for holding a nozzle in which a nozzle hole is formed;

condensing optical system-holding means for holding a condensing optical system, said condensing optical system-holding means being slidably arranged in said nozzle-holding means while maintaining sealing;

moving means for slide-moving said nozzle-holding means and said condensing optical system-holding means relative to each other;

assist-gas feeding means for feeding an assist gas into a laser processing head chamber formed between said condensing optical system of said condensing optical system-holding means and said nozzle hole of said nozzle-holding means;

a fluid chamber formed between said condensing optical system-holding means and said nozzle-holding means;

a passage for communicating said fluid chamber with said laser processing head chamber; and a slide member that slides in said passage while maintaining sealing;

wherein the volume of said fluid chamber increases when said condensing optical system-holding means moves in a direction in which the volume of said laser processing head chamber decreases; and a non-compressible fluid is filled between said fluid chamber and said slide member in said passage.

10. A laser processing head according to claim 9, wherein said passage is formed in said nozzle-holding means.

11. A laser processing head according to claim 9, wherein said passage is formed in said condensing optical system-holding means.

* * * * *

UNITED STATES PATENT AND TRADEMARK OFFICE
CERTIFICATE OF CORRECTION

PATENT NO. : 7,759,602 B2  Page 1 of 1
APPLICATION NO. : 11/457780
DATED : July 20, 2010
INVENTOR(S) : Atsushi Mori et al.

It is certified that error appears in the above-identified patent and that said Letters Patent is hereby corrected as shown below:

On the title page, the Assignee should read as follows:

Item (73) Assignee: Fanuc Ltd (JP)

Signed and Sealed this
Fourth Day of January, 2011

David J. Kappos
*Director of the United States Patent and Trademark Office*